(12) United States Patent
Inaba et al.

(10) Patent No.: US 7,776,415 B2
(45) Date of Patent: Aug. 17, 2010

(54) STRETCH-FORMED MULTILAYER CONTAINER AND PRODUCTION PROCESS FOR THE SAME

(75) Inventors: Yusaku Inaba, Ibaraki (JP); Noboru Ohmori, Ibaraki (JP); Hideaki Tanaka, Ibaraki (JP)

(73) Assignee: Kureha Corporation, Tokyo (JP)

( * ) Notice: Subject to any disclaimer, the term of this patent is extended or adjusted under 35 U.S.C. 154(b) by 341 days.

(21) Appl. No.: 10/574,496

(22) PCT Filed: Oct. 1, 2004

(86) PCT No.: PCT/JP2004/014902

§ 371 (c)(1), (2), (4) Date: Apr. 3, 2006

(87) PCT Pub. No.: WO2005/032813

PCT Pub. Date: Apr. 14, 2005

(65) Prior Publication Data
US 2007/0009693 A1 Jan. 11, 2007

(30) Foreign Application Priority Data
Oct. 3, 2003 (JP) ............................... 2003-346422

(51) Int. Cl.
*B29D 22/00* (2006.01)
*B32B 27/30* (2006.01)

(52) U.S. Cl. ...................... 428/35.7; 428/332; 428/520; 428/522; 428/461; 427/388.4

(58) Field of Classification Search ................. 428/35.7
See application file for complete search history.

(56) References Cited

U.S. PATENT DOCUMENTS

| | | | | |
|---|---|---|---|---|
| 5,439,745 A | * | 8/1995 | Ohba et al. | 428/412 |
| 5,466,498 A | * | 11/1995 | Forloni et al. | 428/36.7 |
| 5,560,988 A | * | 10/1996 | Oba et al. | 428/389 |
| 5,574,096 A | * | 11/1996 | Tanaka et al. | 525/57 |
| 5,621,026 A | * | 4/1997 | Tanaka et al. | 524/52 |
| 5,897,960 A | * | 4/1999 | Oba et al. | 428/532 |
| 6,022,913 A | * | 2/2000 | Tanaka et al. | 524/27 |
| 6,143,384 A | * | 11/2000 | Tanaka et al. | 428/35.8 |
| 6,605,344 B1 | * | 8/2003 | Ohba et al. | 428/332 |
| 6,709,735 B2 | * | 3/2004 | Posey et al. | 428/215 |
| 2006/0222793 A1 | * | 10/2006 | Kashimura et al. | 428/35.7 |

FOREIGN PATENT DOCUMENTS

| | | |
|---|---|---|
| JP | 10-037180 | 2/1998 |
| JP | 10-128923 | 5/1998 |
| JP | 2000-931 | 4/1999 |
| JP | 2000-037822 | 2/2000 |
| WO | WO 9952973 A1 * | 10/1999 |

OTHER PUBLICATIONS

International Search Report for PCT/JP2004/014902.

* cited by examiner

*Primary Examiner*—Rena L Dye
*Assistant Examiner*—Michele Jacobson
(74) *Attorney, Agent, or Firm*—Reed Smith LLP

(57) ABSTRACT

To provide a stretch-formed multilayer container with excellent oxygen-gas barrier properties even in a high humidity atmosphere, which is obtained by stretching a multilayer sheet or a multilayer preform, which contains at least one layer made of a mixture of a polycarboxylic acid-based polymer (B) and a plasticizer (C) and at least one layer made of a mixture of a multivalent metal compound (D) and a resin (E), from 1.1 to 100 times its area draw ratio.

18 Claims, No Drawings

STRETCH-FORMED MULTILAYER CONTAINER AND PRODUCTION PROCESS FOR THE SAME

TECHNICAL FIELD

The present invention relates to a stretch-formed multilayer container obtained by stretching a multilayer sheet or multilayer preform, which contains at least one a layer made of a mixture of a polycarboxylic acid polymer and a plasticizer and at least one a layer made of a mixture of a multivalent metal compound and a resin.

BACKGROUND ART

Polymers containing highly hydrophilic hydrogen-bonding groups in their molecules, which are typified by poly (meth)acrylic acid and polyvinyl alcohol, are known as gas barrier polymers. Although films made of only these polymers show excellent gas (e.g., oxygen gas) barrier properties in a dry atmosphere, their hydrophilicity dramatically reduces gas (e.g., oxygen gas) barrier properties in a high humidity atmosphere. In addition, there is a problem with respect to their resistance properties to hot water; e.g., they dissolve in hot water, which limits the industrial use of them as gas barrier resins.

In order to solve these problems the present inventors propose in Document 1 (Japanese Patent Application Laid-Open No. Hei10-37180 (Claim 1)) a gas-barrier resin composition that has in its chemical structure an ester bond between poly (meth)acrylic acid and a polyalcohol, and an ionic bond between the poly(meth) acrylic acid and multivalent metal ions for the purpose of improving resistance properties of gas barrier films, which are made of a polycarboxylic acid polymer and a polyalcohol polymer, to high-temperature water vapor and hot water.

Document 1 discloses that it is possible to provide gas barrier films with resistance properties to high-temperature water vapor and hot water by constraining the ratio between the ratio of ester bonds and the ratio of ionic bonds to fall in a specific range. Furthermore Document 1 discloses the following: a method for forming an ester bond between poly (meth)acrylic acid and a polyalcohol by heat treatment; and a method for forming an ionic bond between the poly(meth) acrylic acid and multivalent metal ions by further soaking a mixture of the poly(meth)acrylic acid and polyalcohol, which has been subjected to heat treatment, in water containing a multivalent metal compound.

Document 2 (Japanese Patent Application Laid-Open No. Hei10-128923 (Claim 6)) discloses retorting treatment to be carried out in water containing a metal, wherein a retort packaging container is used which is made of a film with an ester bond formed between poly(meth)acrylic acid and a polyalcohol.

Furthermore, Document 3 (Japanese Patent Application Laid-Open No. 2000-931 (Claim 5 and Example 43)) discloses a gas barrier film with improved resistance properties to high-temperature water vapor and hot water, which is made of a polycarboxylic acid-based polymer and a polyalcohol-based polymer.

Document 3 proposes a gas barrier film obtained by applying a metal compound-containing layer on the surface of a molded material layer made of a poly(meth)acrylic acid-based polymer and a polyalcohol-based polymer, and discloses that in this way it is made possible to readily provide a gas barrier film with improved gas (e.g., oxygen gas) barrier properties, as well as with improved resistance properties to high-temperature water vapor and hot water.

All of the foregoing Document 1, Document 2 and Document 3 disclose that a multivalent metal compound is allowed to act on a mixture of a poly(meth)acrylic acid polymer and a polyalcohol polymer, and that it is thus possible to provide resistance properties to high-temperature water vapor and hot water. However, for the gas barrier resin composition or gas barrier film to have sufficient oxygen-gas barrier properties and resistance properties to high-temperature water vapor and hot water, the mixture of a poly(meth)acrylic acid polymer and a polyalcohol polymer needs to be denatured by a predetermined treatment (e.g., heat treatment). If the mixture is not sufficiently denatured, it is impossible to have sufficient oxygen-gas barrier properties and resistance properties to high-temperature water vapor and hot water to the resultant film. Moreover, molded materials made of such a mixture are not stretchable; thus, a forming method is limited. In addition, Document 3 fails to describe the influence of enlargement of a gas barrier film to its gas barrier properties. For this reason, the emergence of a molded material, which is obtained by stretching a film or sheet formed by allowing a multivalent metal compound to act on a film made of a mixture of a poly(meth)acrylic acid polymer and a polyalcohol polymer, has been long awaited.

Document 4 (Japanese Patent Application No. 2002-121246 (Claim 1)) discloses a film derived from a polycarboxylic acid-based polymer (A) and a multivalent metal compound (B), wherein the peak ratio ($A_{1560}/_{1700}$) in an infrared absorption spectrum is 0.25 or more.

Document 5 (Japanese Patent Application Laid-Open No. 2000-37822 (Claim 1)) discloses a production process for a coating film, wherein a water-based coating solution that contains at least a poly(meth)acrylic acid-based polymer, a polyalcohol-based polymer, a plasticiser and a water-based medium, is applied to at least one surface of a film to be coated to form a coated film on which a coat layer is arranged, and the coated film is stretched under heating conditions, with the plasticiser being present in the coat layer. Document 5, however, fails to describe the combination of such a coating film with a multivalent metal compound layer.

It is an object of the present invention to provide a stretch-formed multilayer container that has excellent oxygen-gas barrier properties even in a high humidity atmosphere.

DISCLOSURE OF THE INVENTION

The present inventors have diligently conducted studies in order to solve the foregoing problems. As a result, they established that it is possible to provide a multilayer container with excellent gas barrier properties by forming by a coating method at least one a layer made of a mixture of a polycarboxylic acid-based polymer and a plasticizer and at least one a layer made of a mixture of a multivalent metal compound and resin on a sheet layer or a preform layer made of thermoplastic resin, and by performing heat stretch forming for the sheet or the preform. Thus, they have completed the present invention.

The first of the present invention provides a stretched-formed multilayer container formed by stretching a multilayer sheet or multilayer preform from 1.1 to 100 times its area draw ratio, said multilayer sheet or said multilayer preform containing at least one a layer (bc) made of a mixture of a polycarboxylic acid-based polymer (B) and a plasticiser (C) and at least one a layer (de) made of a mixture of a multivalent metal compound (D) and a resin (E).

The second of the present invention provides the stretched-formed multilayer container according to the first of the present invention, containing at least one a (bc)/(de) layer unit, which has the layer (bc) and the layer (de) adjacent to each other.

The third of the present invention provides the stretched-formed multilayer container according to the first of the present invention, containing at least one a (de)/(bc)/(de) layer unit, which has the layer (bc) and the layer (de) adjacent to each other.

The fourth of the present invention provides the stretched-formed multilayer container according to one of the first to third of the present inventions, wherein the multilayer sheet or the multilayer preform contains at least one a layer (a) made of thermoplastic resin (A).

The fifth of the present invention provides the stretched-formed multilayer container according to one of the first to fourth of the present inventions, wherein in all of the layer (bc) and the layer (de), the chemical equivalent of the multivalent metal in the total amount (Dt) of the multivalent metal compound (D) is 0.2 or more relative to the total amount (Bt) of carboxyl groups contained in the layer (bc) and the layer (de).

The sixth of the present invention provides the stretched-formed multilayer container according to one of the first to fifth of the present inventions, wherein the mixing ratio between the polycarboxylic acid-based polymer (B) and the plasticiser (C) is 70/30 to 99.9/0.1 (mass ratio).

The seventh of the present invention provides the stretched-formed multilayer container according to one of the first to sixth of the present inventions, wherein the polycarboxylic acid-based polymer (B) has an oxygen permeability coefficient of 1000 $cm^3$ (STP)·μm/($m^2$·day·MPa) or less at 30° C. and relative humidity of 0% when formed into a film by itself.

The eighth of the present invention provides the stretched-formed multilayer container according to one of the first to seventh of the present inventions, wherein the polycarboxylic acid-based polymer (B) is a homopolymer, a copolymer and/or a mixture thereof, the homopolymer and the copolymer consisting of at least one of polymerizable monomer units selected from acrylic acid, maleic acid and methacrylic acid.

The ninth of the present invention provides the stretched-formed multilayer container according to one of the first to eight of the present inventions, wherein the multivalent metal compound (D) is a bivalent metal compound.

The tenth of the present invention provides a multilayer sheet used for the stretched-formed multilayer container according to one of the first to ninth of the present inventions.

The eleventh of the present invention provides a multilayer preform used for the stretched-formed multilayer container according to one of first to ninth of the present inventions.

The twelfth of the present invention provides the stretched-formed multilayer container according to one of the first to ninth of the present inventions, which is used for boiling or retort sterilization.

The thirteenth of the present invention provides a production method of a stretch-formed multilayer container, wherein a multilayer sheet or a multilayer preform is stretched from 1.1 to 100 times its area draw ratio, said multilayer sheet or said multilayer preform obtained by forming by a coating method at least one a layer (bc) made of a mixture of a polycarboxylic acid-based polymer (B) and a plasticiser (C) and at least one a layer (de) made of a mixture of a multivalent metal compound (D) and a resin (E) on a layer (a) made of thermoplastic resin (A).

The fourteenth of the present invention provides the production method according to the thirteenth of the present invention, wherein at least one a (bc)/(de) layer unit which has the layer (bc) and the layer (de) adjacent to each other, is provided.

The fifteenth of the present invention provides the production method according to the thirteenth of the present invention, wherein at least one a (de)/(bc)/(de) layer unit, which has the layer (bc) and the layer (de) adjacent to each other, is provided.

The sixteenth of the present invention provides the production method according to one of the thirteenth to fifteenth of the present inventions, wherein in all of the layer (bc) and the layer (de), the chemical equivalent of the multivalent metal in the total amount (Dt) of the multivalent metal compound (D) is 0.2 or more relative to the total amount (Bt) of carboxyl groups contained in the layer (bc) and the layer (de).

The seventeenth of the present invention provides the production method according to one of the thirteenth to sixteenth of the present inventions, wherein the mixing ratio between the polycarboxylic acid-based polymer (B) and the plasticiser (C) is 70/30 to 99.9/0.1 (mass ratio).

The eighteenth of the present invention provides the production method according to one of the thirteenth to seventeenth of the present inventions, wherein the polycarboxylic acid-based polymer (B) has an oxygen permeability coefficient of 1000 $cm^3$ (STP)·μm/($m^2$·day·MPa) or less at 30° C. and relative humidity of 0% when formed into a film by itself.

The nineteenth of the present invention provides the production method according to one of the thirteenth to eighteenth of the present inventions, wherein the polycarboxylic acid-based polymer (B) is a homopolymer, a copolymer and/or a mixture thereof, the homopolymer and the copolymer consisting of at least one of polymerizable monomer units selected from acrylic acid, maleic acid and methacrylic acid.

The twentieth of the present invention provides the production method according to one of the thirteenth to nineteenth of the present inventions, wherein the multivalent metal compound (C) is a bivalent metal compound.

According to the present invention, it is possible to provide a stretchable multilayer sheet or a multilayer preform, which contains at least one a layer made of a plasticiser-containing polycarboxylic acid-based polymer plus at least one a layer made of a mixture of a multivalent metal compound and a resin, and to provide a stretch-formed multilayer container with excellent gas barrier properties even in a high humidity atmosphere by stretching the multilayer sheet or multilayer preform.

BEST MODE FOR CARRYING OUT THE INVENTION

Hereinafter, the present invention will be described in detail.

The stretch-formed multilayer container of the present invention is a stretch-formed multilayer container (hereinafter referred to as a "multilayer container" in some cases) obtained by stretching a multilayer sheet or multilayer preform (or parison extruded from an extruder), which contains at least one a layer (bc) made of a mixture of a polycarboxylic acid-based polymer (B) and a plasticizer (C) and at least one a layer (de) made of a mixture of a multivalent metal compound (D) and a resin (E), from 1.1 to 100 times its area draw ratio. Layer (bc) and layer (de) according to the present invention, the layer (bc) being made of the polycarboxylic acid-based polymer (B) and the plasticizer (C), and the layer (de) being made of the multivalent metal compound (D) and the resin (E), are excellent in their stretchability even after they are applied to films and dried. Thus, it is possible to provide an excellent stretch-formed multilayer container.

Materials for the layer (bc) according to the present invention will be described below.

The polycarboxylic acid-based polymer (B) is not particularly limited as longs as it is an existing polycarboxylic acid-based polymer. For the stretch-formed multilayer container of the present invention to have excellent gas barrier properties and resistance properties to high-temperature water vapor and hot water, the polycarboxylic acid-based polymer (B) as a raw material is a polycarboxylic acid-based polymer with an oxygen permeation coefficient of not greater than 1000 cm$^3$ (STP)·μm/(m$^2$·day·MPa), more preferably not greater than 500 cm$^3$ (STP)·μm/(m$^2$·day·MPa), particularly preferably not greater than 100 cm$^3$ (STP)·μm/(m$^2$·day·MPa) when formed into a film by itself, the oxygen permeation coefficient measured at 30° C. and relative humidity of 0% in a dry atmosphere.

Here, the oxygen permeation coefficient can be determined in the following procedure, for example.

The polycarboxylic acid-based polymer (B) is dissolved in a solvent (e.g., water) to a concentration of 10 wt %. With a bar coater the solution thus prepared is then coated to a base material made of plastic and is dried. In this way a coating film is produced that has a polycarboxylic acid polymer layer of 1 μm thickness, and its oxygen permeability is measured at 30° C. and relative humidity of 0% after a drying process of the resultant coating film. Here, any plastic film whose oxygen permeability coefficient is known is used for the plastic base material. If the oxygen permeability of the resultant coating film is 1/10 or less than that of the plastic film itself used as the base material, the oxygen permeability thus measured can be regarded to be equal to the oxygen permeability of the polycarboxylic acid-based polymer (B) layer itself.

The measured value is the oxygen permeability of the polycarboxylic acid-based polymer (B) which measures 1 μm in thickness. Thus, the value can be converted into oxygen permeation coefficient by multiplying it by 1 μm.

As the polycarboxylic acid-based polymer (B) used in the present invention, existing polycarboxylic acid-based polymers can be used. Here, existing polycarboxylic acid-based polymers are a generic name for polymers with two or more carboxyl groups in their molecules; specific examples thereof include homopolymers of α,β-monoethylenically unsaturated carboxylic acids as polymerizable monomers, copolymers of at least two different α,β-monoethylenically unsaturated carboxylic acids as monomer units, copolymers of α,β-monoethylenically unsaturated carboxylic acids and other ethylenic unsaturated monomers, and acidic polysaccharides such as alginic acid, carboxymethylcellulose and pectin, which bear carboxyl groups in their molecules. These polycarboxylic acid-based polymers (B) may be used singly or in combination of two or more.

Here, typical examples of α,β-monoethylenically unsaturated carboxylic acids include acrylic acid, methacrylic acid, itaconic acid, maleic acid, fumaric acid and crotonic acid. In addition, typical examples of ethylenic unsaturated monomers that can be copolymerized with these acids include ethylene, propylene, vinyl esters of saturated carboxylic acids (e.g., vinyl acetate), alkylacrylates, alkylmethacrylates, alkylitaconates, acrylonitrile, vinyl chloride, vinylidene chloride, vinyl fluoride, vinylidene fluoride and styrene. If the polycarboxylic acid-based polymer (B) is a copolymer of an α,β-monoethylenically unsaturated carboxylic acid and a vinyl ester of saturated carboxylic acids (e.g., vinyl acetate), the copolymer may be further saponificated to convert a part of the vinyl ester of saturated carboxylic acid into vinyl alcohol before use.

In addition, if the polycarboxylic acid-based polymer (B) of the present invention is a copolymer of an α,β-monoethylenically unsaturated carboxylic acid and an ethylenic unsaturated monomer other than α,β-monoethylenically unsaturated carboxylic acids, the α,β-monoethylenically unsaturated carboxylic acid preferably comprises 60 mol % or more, more preferably 80 mol % or more, particularly preferably 100 mol % of the copolymer (i.e., the copolymer preferably consists of the α,β-monoethylenically unsaturated carboxylic acid) in order to ensure that the multilayer container of the present invention has excellent gas barrier properties and resistance properties to high-temperature water vapor and hot water. Furthermore, if the polycarboxylic acid-based polymer (B) is a polymer consisting of α,β-monoethylenically unsaturated carboxylic acids, preferable specific examples thereof include polymers that result from the polymerization of at least one of polymerizable monomers selected from the group consisting of acrylic acid, methacrylic acid, itaconic acid, maleic acid, fumaric acid and crotonic acid, and mixtures thereof; more preferably, homopolymers, copolymers and/or mixtures thereof can be used, the homopolymer and the copolymer consisting of at least one of polymerizable monomers selected from acrylic acid, methacrylic acid and maleic acid; Most preferably, polyacrylic acid, polymethacrylic acid, polymaleic acid and a mixture thereof can be used. If the polycarboxylic acid-based polymer (B) is not a polymer of α,β-monoethylenically unsaturated carboxylic acid monomers, but an acidic polysaccharide for example, alginic acid can be suitably used.

The number-average molecular weight of the polycarboxylic acid-based polymer (B) is not particularly limited. For excellent film formability, however, the polycarboxylic acid-based polymer (B) preferably has a number-average molecular weight of 2,000 to 10,000,000, more preferably 5,000 to 1,000,0000.

In the present invention the layer (bc) is made of a mixture of the polycarboxylic acid-based polymer (B) and the plasticiser (C). The plasticiser (C) used in the present invention can be appropriately selected from known plasticisers. Examples of thereof include glycols such as ethylene glycol, trimethylene glycol, propylene glycol, tetramethylene glycol, 1,3-butanediol, 2,3-butanediol, pentamethylene glycol, hexamethylene glycol, diethylene glycol, triethylene glycol, polyethylene glycol and polyethylene oxide, sorbitol, mannitol, dulcitol, erythritol, glycerin, lactose and fatty acids. These may be used as mixture depending on the circumstances. It should be noted that among these, glycerin, ethylene glycol, polyethylene glycol and the like are preferable in view of stretchability and gas barrier properties. The plasticiser (C) is mixed with the polycarboxylic acid-based polymer (B). The mixing ratio between the polycarboxylic acid-based polymer (B) and the plasticiser (C) is 70/30 to 99.9/0.1, more preferably 80/20 to 99/1, particularly preferably 85/15 to 95/5 (mass ratio) Allowing this mixing ratio to lie in this range is preferable because stretchability and gas barrier properties can be achieved at the same time. The polycarboxylic acid-based polymer (B) in the layer (bc) reacts with the multivalent metal compound (D) in the layer (de) to form a salt, thereby providing stable gas barrier properties.

Materials for the layer (de) according to the present invention will be described.

The layer (de) is made of a mixture of the multivalent metal compound (D) and the resin (E). The multivalent metal compound (D) is a multivalent metallic element with a valency of two or more, or a compound thereof. For the multilayer container of the present invention to have excellent gas barrier properties and resistance properties to high-temperature water vapor and hot water, as well as to be manufactured easily, divalent metal compounds are preferably used for the multivalent metal (D). In all of the layer (bc) and the layer (de) the chemical equivalent of the multivalent metal in the total amount (Dt) of the multivalent metal compound (D) is 0.2 or more, preferably in a range of 0.5 and 10 relative to the total amount (Bt) of carboxyl groups contained in the layer (bc) and the layer (de); further the chemical equivalent is more preferably in a range of 0.8 to 5 in light of the foregoing reasons as well as formability and transparency of films.

Specific examples of multivalent metals include alkaline-earth metals such as beryllium, magnesium and calcium, transition metals such as titan, zirconium, chrome, manganese, iron, cobalt, nickel, copper and zinc, and aluminum. Specific examples of multivalent metal compounds include oxides, hydroxides, carbonates, organic salts and inorganic salts of the multivalent metals, ammonium complexes of the multivalent metals, secondary, tertiary and quaternary amine complexes of the multivalent metals, and carbonates and organic salts of these amine and ammonium complexes. Examples of organic salts include acetates, oxalates, citrates, lactates, phosphates, phosphites, hypophosphites, stearates and salts of monoethylenically unsaturated carboxylic acids. Examples of inorganic salts include chlorides, sulfates and nitrates. Other examples include alkylalcoxides of the multivalent metals.

The polycarboxylic acid-based polymer (B) may be partially neutralized with a monovalent metal (e.g., an alkali metal) or ammonia beforehand without causing the stretch-formed multilayer container of the present invention to show poor gas barrier properties and resistance properties to high-temperature water vapor and hot water.

The form of the multivalent metal compound (D) is not particularly limited. The multivalent metal compound (D) is, however, preferably in the form particles with a small diameter in light of transparency of sheets. In addition, when a coating mixture is prepared for producing a multilayer sheet or multilayer preform that constitutes the multilayer container of the present invention as described later, the multivalent metal compound is preferably in the form of particles with a small diameter in order to increase the efficiency of the preparation process and to provide a more uniform coating mixture. The multivalent metal compound preferably has an average particle diameter of 5 μm or less, more preferably 1 μm or less, particularly preferably 0.1 μm or less.

Examples of the resin (E) to be used with the multivalent metal compound (D) constituting the layer (de) in the present invention include thermoplastic resins and thermosetting resins; any resin used for coating compositions can be used suitably. Specific examples thereof include alkyd resins, aminoalkyd resins, melamine resins, acrylic resins, soluble cotton, urethane resins, polyester resins, phenol resins, amino resins, fluorocarbon resins, silicone resins, epoxy resins, vinyl resins, cellulose-based resins and natural resins. Note that curing agents can be used appropriately, and examples thereof include publicly known resins such as melamine resins, polyisocyanates and polyamines.

The mixing ratio between the multivalent metal compound (D) and the resin (E) is 1/100 to 10/1, more preferably 1/10 to 5/1, particularly preferably 1/5 to 2/1 (mass ratio). Allowing this mixing ratio to lie in this range is preferable because both stretchability and gas barrier properties can be achieved at the same time. In addition, water, organic solvent and the like may be added to the suspension of the multivalent metal compound (D) and the resin (E) to adjust its viscosity to improve coating performance without changing its nature.

The thickness of the layer (bc) and the layer (de) after coating and drying processes and before a stretch forming process is not particularly limited as long as the chemical equivalent of the multivalent metal in the total amount (Dt) of the multivalent metal compound (D) is 0.2 or more relative to the total amount (Bt) of carboxyl groups in the polycarboxylic acid-based polymer (B). For excellent oxygen-gas barrier properties, the thickness of the layer (bc) is, however, preferably 0.05 to 100 μm, more preferably 0.1 to 10 μm, particularly preferably 0.2 to 5 μm. The layer (bc) with a thickness of below 0.05 μm is unable to offer excellent stretchability when laminated with the layer (de). Meanwhile, the layer (bc) with a thickness of greater than 100 μm is not preferably in light of productivity. For excellent stretch-formability and gas barrier properties, the thickness of the layer (de) is preferably 0.05 to 100 μm, more preferably 0.1 to 10 μm, particularly preferably 0.2 to 5 μm.

In order to form ionic bonds between carboxyl groups of the polycarboxylic acid-based polymer (B) in the layer (bc) and the multivalent metal compound (D) in the layer (de), the layer (bc) and the layer (de) in a multilayer sheet or multilayer preform preferably adopt a layer configuration in which at least one (bc)/(de) layer unit which has the layer (bc) and the layer (de) adjacent to each other, is contained. Furthermore, a layer configuration in which at least one (de)/(bc)/(de) layer unit or (bc)/(de)/(bc) layer unit which has the layer (bc) and the layer (de) adjacent to each other, is contained is also preferable.

Since the present invention is not required to use heating operations or to add catalysts to facilitate esterification between hydroxyl groups of the plasticiser (C) and carboxyl groups of the polycarboxylic acid-based polymer (B), there is a small likelihood of the formation of ester bonds. Chiefly, carboxyl groups of the polycarboxylic acid-based polymer (B) are utilized for the formation of ionic bonds to the multivalent metal compound (D).

A multilayer sheet or multilayer preform which contains at least one aforementioned layer (bc) and at least one aforementioned layer (de), preferably contains at least one additional layer (a) made of thermoplastic resin (A).

The thermoplastic resin (A) is not particularly limited; for example, polyolefin-based polymers such as low-density polyethylene, high-density polyethylene, linear low-density polyethylene, polypropylene, poly-4-methylpentene and cyclic polyolefin, copolymers thereof and acidic degradation products thereof; vinyl acetate-based copolymers such as polyvinyl acetate, ethylene vinyl acetate copolymers, saponification products of ethylene vinyl acetate copolymers and polyvinyl alcohol; aromatic polyester-based polymers such as polyethylene terephthalate, polybuthylene terephthalate and polyethylene napthalate, and copolymers thereof; aliphatic polyester-based polymers such as poly-ε-caprolactone, polyhydroxybutylate and polyhydroxyvalerate, and copolymers thereof; polyamide-based polymers such as nylon 6, nylon 66, nylon 12, nylon 6/66 copolymer, nylon 6/12 copolymer, methaxylene adipamide/nylon 6 copolymer, and copolymers thereof; polyether-based polymers such as polyethersulfone, polyphenylene sulfide and polyphenylene oxide; chlorine-based and fluorine-based polymers such as polyvinyl chloride, polyvinylidene chloride, polyvinyl fluoride and polyvinylidine fluoride and copolymers thereof; acrylic-based polymers such as polymethylacrylate, polyethylacrylate, polymethylmethacrylate, polyethylmethacrylate and polyacrylonitrile, and copolymers thereof; styrene-based polymers such as polystyrene, and copolymers thereof;

and polyimide-based polymers and copolymers thereof, can be used. The usage of the layer (a) made of the thermoplastic resin (A) can be appropriately selected depending on the function required. For example, the layer (a) may be used as the base material for the layer (bc) and the layer (de), or may be used as an outer layer (e.g., as a durable layer or seal layer) or as an intermediate layer (e.g., as a reinforcing layer or gas barrier-assisting layer). Among these polymers, for example, polyethylene terephthalate, polypropylene, polyamide-based polymers and polystyrene are preferable because of their stretch-formability. The layer (a) may be a stretched layer or a unstretched layer.

The thickness of the thermoplastic resin layer (A) is preferably 10 μm to 50 mm, more preferably 10 to 500 μm. With or without an adhesive backing, the layer (bc) or the layer (de) is generally applied on one or both surfaces of the layer (a) made of the thermoplastic resin (A). The order in which these layers are applied may be: layer (a)/layer (bc)/layer (de) . . . , or layer (a)/layer (de)/layer (bc) . . . . A layer configuration having at least one layer (a) and at least one layer unit selected from the layer units consisting of a layer (bc)/layer (de) unit, layer (de)/layer (bc)/layer (de) unit and layer (bc)/layer (de)/layer (bc) unit is preferable. Further, the layer (a) may be provided in the multilayer sheet in multiple numbers. Furthermore, an adhesive or anchor agent may be appropriately provided between layer (a), layer (bc) and layer (de), e.g., between the layer (a) and the layer (bc) or between the layer (a) and the layer (de). For example, an adhesive with a similar configuration as the resin (E) may be provided between the layer (a) and the layer (bc).

The thickness of a multilayer sheet or multilayer preform (e.g., parison extruded from an extruder), constituted by these layers, is properly determined depending on the thickness of a multilayer container, a final product; the thickness of the multilayer sheet is preferably 10 μm to 50 mm, more preferably 10 to 500 μm, and the thickness of the multilayer preform is preferably 1 to 20 mm, more preferably 1 to 10 mm.

The multilayer sheet and multilayer preform are stretchable as described above, and are preferably capable of being stretched in the range of 1.1 to 100 times, more preferably 1.1 to 50 times, particularly preferably 1.1 to 25 times its area ratio.

Next, a production process for the multilayer container of the present invention will be described, where, by way of example, polyacrylic acid (abbreviated "PAA") and zinc oxide granules are used as the polycarboxylic acid resin (B) and the multivalent metal compound (D), respectively. Note that the aforementioned description will be provided for a preferred aspect of the resultant multilayer container.

Polyacrylic acid (PAA) is diluted with water to prepare, for example, 5 wt % aqueous PAA solution. To 90 weight parts of the resultant aqueous PAA solution, for example, is added 10 weight parts of 5 wt % aqueous glycerin solution as a plasticiser, followed by stirring. In this way an aqueous mixture of PAA and glycerin is prepared. The aqueous mixture of PAA and glycerin thus obtained is then applied on one or both surfaces of a unstretched amorphous polyethylene terephthalate sheet (or PET sheet) of 250 μm thickness by a coating method (e.g., by use of a desk coater), and the resultant PET sheet is dried at a temperature ranging from room temperature to 90° C. for 10 to 60 seconds (e.g., at 70° C. for 30 seconds) to produce a dried coated film.

Meanwhile, to 100 weight parts of a suspension of zinc oxide granules and a polyester resin (nonvolatile components: 33%, solvent: toluene/MEK) is added 0-15 weight parts of a curing agent to prepare a mixture containing a multivalent metal compound. Using a desk coater, this zinc oxide mixture is then applied on the surface of the PET sheet, where the PAA/glycerin mixture is applied and dried, and is dried at a temperature ranging from room temperature to 90° C. for 10 seconds to 60 minutes (e.g., at 70° C. for 30 seconds) so that it has a thickness of about 1 μm.

Here, the mixing ratio between zinc oxide and resin in the suspension of the zinc oxide granules and resin is 1/100 to 10/1. The amount of zinc (Zn) in the coated film is 0.2 chemical equivalents or more relative to the amount of carboxyl groups in PAA.

The coating method as used herein means a coating process including methods for applying a suspension or solution of the polycarboxylic acid-based polymer (B) and the plasticiser (C), or a suspension or solution of the multivalent metal compound (D) and the resin (E) on the surface of the layer (a) made of the thermoplastic resin (A) by use of a gravure coater, a reverse roll coater, a dip coater, a die coater, a mayer rod coater and a brush, methods for spaying the suspensions or solutions using a spray or the like, and a dipping method.

In this way a mutilayered sheet to be formed is produced which is formed of a layer (a) made of a unstretched amorphous polyethylene terephthalate, a layer (bc) made of a mixture of PAA and glycerin, and a layer (de) made of zinc oxide granules and a polyester resin. In general, the thickness of the multilayer sheet is preferably 10 μm to 50 mm, more preferably 10 to 500 μm. This multilayer sheet is then heated, softened and vacuum-formed using a deep drawn type high speed automatic vacuum pack machine (FV 603 manufactured by Omori Machinery Co., Ltd.) to produce, for example, a stretch-formed container with a diameter of 100 mm and a depth of 10 mm in which the PET layer (a), a base material, is arranged at the innermost so as to come in contact with material packed in the container. Using a stretch forming machine the container thus produced is generally stretched to about 1.1 to 5 times its area. For the forming machine, a melt forming machine, a vacuum forming machine or a compression forming machine can be used. Furthermore conventionally known forming method, for example, plug-combined forming methods (e.g., straight forming, drape forming, air-slip forming, snap-back forming and plug-assisted forming) in which material is formed in a mold and compression forming, can be used appropriately. Alternatively, publicly known forming methods (e.g., compression forming) can also be used.

When the base resin layer is a bottle preform, the layer (bc) or layer (de) is applied by a dipping method on it, followed by drying. Subsequently, the layer (de) or layer (bc) is applied by a dipping method on the layer applied, followed by drying. After the drying process, stretch forming is performed for the resultant coated preform using a bottle forming machine at a temperature suitable for the base resin to produce a bottle. The multilayer container (e.g., a stretch-formed container or bottle) produced in this way preferably has an oxygen permeability of not greater than 200 cm$^3$ (STP)/(m$^2$·day·MPa), more preferably not greater than 100 cm$^3$ (STP)/(m$^2$·day·MPa) at 30° C. and at relative humidity of 80%. The oxygen permeability of the multilayer container of the present invention can be determined in the manner described later.

Examples of the specific form of the stretch-formed multilayer container of the present invention produced in this way include bottle, tray, cup, tube and containers obtained by attaching caps or opening sealing materials to them. Any layer configuration can be selected for these containers on an arbitrary basis, thereby providing them with excellent openability, tearability, contractility, suitability for microwave, ultraviolet shielding ability and design features. The stretch-formed multilayer container of the present invention is suitable as a package or packaging container for foods, drinks, chemicals, medicines and precision metallic components (e.g., electronic components), which are susceptible to degradation by oxygen and the like, and can be suitably used as a packaging container for goods that are required to be stably protected from gases over a long period of time and to undergo high-temperature hot water treatments (e.g., boiling and retort sterilization). Specific examples goods that are required to undergo such high-temperature treatments include seasoned foods such as curry, stew and pasta sauce, seasoning mixes such as Chinese food base, baby foods, rice, rice gruel, ready-made foods that can be cooked quickly in an oven toaster and microwave, soups, desserts and agricultural and livestock products. Examples of agricultural products include foods that undergo boiling or retorting treatment for cooking, such as grains (e.g., potato, sweet potato, corn and chestnut), vegetables (e.g., asparagus, broccoli, cabbage, bamboo shoot and tomato), root vegetables (e.g., radish, carrot, yam, burdock and lotus root), mushrooms, fruits (e.g., apple and pineapple). Examples of livestock products include sausage and ham.

Meanwhile, the stretch-formed multilayer container of the present invention is readily soluble in acid or alkali base solutions under a particular condition, and has easy disposability that allows it to be readily separated from other trash. Among the applicable fields described above, the stretch-formed multilayer container of the present invention can therefore be suitably used in the field where packaging materials need to be separated from other trash.

EXAMPLES

Hereinafter, the present invention will be described in detail based on Examples. However, the present invention is not limited to Examples.

Measurement Method of Oxygen Permeability.

For measurement of the oxygen permeability of (1) stretch-formed multilayer container and (2) layered film obtained by applying polyacrylic acid (PAA) on polyethylene terephthalate for the purpose of measurement of the oxygen permeability of PAA, oxygen permeability measurement was made in the following manner. Measurement was made using OXTRAN™ 2/20, an oxygen permeability tester manufactured by Modern Control Inc., in accordance with JIS K-7126 B method (equal pressure method) and ASTM D3985-81. The oxygen permeability of (1) stretch-formed multilayer container was measured at 30° C. and relative humidity of 80% (expressed as 80% (RH) in some cases) and was expressed in terms of $cm^3$ (STP)/($m^2 \cdot day \cdot MPa$). The oxygen permeability of (2) PAA was measured at 30° C. and relative humidity of 0%, and the obtained value was multiplied by the thickness of PAA to yield an oxygen permeation coefficient expressed in terms of $cm^3$ (STP) $\mu m$/($m^2 \cdot day \cdot MPa$). Here, (STP) means the normal condition (0° C., 1 atm) under which the volume of oxygen is specified.

The oxygen permeability of (1) stretch-formed multilayer container was measured in the following manner. First, two copper pipes were inserted into an aluminum plate, avoiding the escape of gases through the gap. Using an adhesive the opening of the container is then sealed with the aluminum plate, with the tip ends of both pipes being inside the container (i.e., the aluminum plate equipped with two copper pipes serves as a lid of the container). Nitrogen gas (80% RH) was introduced in the container from one of the copper pipes, so that gas in the container was discharged through the other copper pipes. The gas discharged from the container is a mixture of nitrogen gas and oxygen gas which has passed through the wall of the container, and was introduced into an oxygen sensor to determine the amount of oxygen contained in the gas. In this way the amount of oxygen entered the container was determined. Note that the whole container was placed in a chamber, where an oxygen gas atmosphere was maintained at 30° C. and relative humidity of 80%. Thus, it was made possible to determine the oxygen permeability of the whole container at normal pressure. Note that in Examples the surface area of the container was determined, and the obtained oxygen permeability was converted into the amount of oxygen permeated per unit surface area.

The oxygen permeability of the layered film (2) obtained by applying PAA on polyethylene terephthalate was determined by the foregoing measurement method using a cell for film at 30° C. and relative humidity of 0%. The oxygen permeability of the PAA-coated sheet was determined in a dried condition because relative humidity influences the oxygen permeability of the film formed of a monolayer of the polycarboxylic acid-based polymer (B). Here, "dried condition" means that the samples was dried at relative humidity of 0%. From the following equation the oxygen permeability of the PAA layer was determined using the measurement result.

$$1/P_{TOTAL} = 1/P_{PAA} + 1/P_{BASE}$$

where $P_{TOTAL}$ denotes the oxygen permeability of the layered body itself (measurement result); $P_{BASE}$ denotes the oxygen permeability of the base film; and $P_{PAA}$ denotes the oxygen permeability of the PAA layer.

Example 1

Polyacrylic acid (PAA) (Aron™ A-10H, manufactured by TOAGOSEI Co., Ltd., 25% aqueous solution, number average molecular weight: 150,000) was diluted to 1/5-fold with distilled water to prepare a 5 wt % PAA aqueous solution. To 90 weight parts of the resultant PAA aqueous solution was added 10 weight parts of a 5 wt % glycerin aqueous solution (prepared by diluting a commercially available glycerin (manufactured by Wako Pure Chemical Industries, Ltd.) to 20-fold with distilled water). The resultant solution was stirred, and thus an aqueous mixture of PAA and glycerin was prepared. Using a desk coater (K303PR00FER, manufactured by RK Print-Coat Instruments, Ltd.) the aqueous mixture was applied on a unstretched amorphous polyethylene terephthalate sheet (Royfan A-PET-CR, thickness: 250 $\mu m$, hereinafter abbreviated "unstretched amorphous PET sheet"), and the resultant sheet was dried. In this way a dried coated film of 0.7 $\mu m$ thickness was produced. To 100 weight parts of a suspension of zinc oxide granules and a polyester resin (transparent UV shielding suspension ZR-133, manufactured by Sumitomo Osaka Cement Co., Ltd. (a layer made of this suspension is represented as ZR in Table), nonvolatile components: 33%, solvent: toluene/MEK) was added 5 weight parts of a curing agent (DN-980, manufactured by Dainippon Ink And Chemicals, Inc), and the resultant solution was stirred. Thereafter, using a desk coater this solution was applied on the surface of the PET sheet, where the aqueous mixture of PAA and glycerin had been applied, and the PET sheet was dried. Thus, a unstretched multilayer sheet was produced; the amount of the dried coating on the sheet was 2 g/$m^2$ (thickness: about 1 $\mu m$).

Here, the mixing ratio between zinc oxide and resin in the suspension of the zinc oxide granules and resin was 1.5/1

(mass ratio). The amount of Zn in the coated film was 100 mol % (2 chemical equivalents) relative to the amount of carboxyl groups in PAA. Next, this multilayer sheet thus produced was heated and softened at 100 to 120° C. and vacuum-formed using a deep drawn type high speed automatic vacuum pack machine (FV-603 manufactured by Omori Machinery Co., Ltd.) to produce a heat stretched container with a diameter of 100 mm and a depth of 10 mm in which the PET layer was arranged at the innermost so as to come in contact with material packed in the container. The packaging container was stretched to 1.4 times its area. The oxygen permeability of the resultant packaging container was determined.

Note that the oxygen permeability coefficient of the PAA layer of the layered film used in this Example, obtained by applying PAA on a unstretched amorphous PET sheet, was 100 $cm^3$ (STP)·μm/($m^2$·day·MPa) at 30° and relative humidity of 0%.

Example 2

A heat-stretched container was produced and its oxygen permeability was determined in a similar way as in Example 1, with exception that partially neutralized polyacrylic acid, obtained by treatment with sodium (Na), was used instead of intact polyacrylic acid and that polyethylene glycol (manufactured by Wako Pure Chemical Industries, Ltd. PEG, molecular weight: 600) was used instead of the plasticizer.

Partially neutralized polyacrylic acid was prepared by adding and dissolving sodium hydride in the 5 wt % polyacrylic acid aqueous solution prepared in Example 1. The amount of sodium hydride added was calculated so that the amount of Na was 10 mol % (0.1 chemical equivalents) relative to the number of moles of carboxyl groups in the polyacrylic acid aqueous solution.

Example 3

A heat-stretched container was produced and its oxygen permeability was determined in a similar way as in Example 1, with exception that a 5 wt % sorbitol aqueous solution (manufactured by Wako Pure Chemical Industries, Ltd.) was used instead of the plasticiser and that 5 weight parts of sorbitol (manufactured by Wako Pure Chemical Industries, Ltd.) was added to 95 weight parts of a polyaclylic acid aqueous solution to prepare an aqueous mixture of PAA and sorbitol by stirring the resultant solution. Note that the amount of Zn in the coated film was 95 mol % (1.9 chemical equivalents) relative to the amount of carboxyl groups in PAA.

Example 4

A heat-stretched container was produced and its oxygen permeability was determined in a similar way as in Example 1, with exception that ethylene glycol (manufactured by Wako Pure Chemical Industries, Ltd.) was used instead of the plasticiser and that 30 weight parts of a 5 wt % ethylene glycol aqueous solution was added to 70 weight parts of a polyaclylic acid aqueous solution to prepare an aqueous mixture of PAA and ethylene glycol by stirring the resultant solution. The amount of Zn in the coated film was 130 mol % (2.6 chemical equivalents) relative to the amount of carboxyl groups in PAA.

Example 5

A heat-stretched container was produced and its oxygen permeability was determined in a similar way as in Example 1, with exception that 0.1 weight part of a 5 wt % glycerin aqueous solution was added to 99.9 weight parts of a polyacrylic acid aqueous solution. The amount of Zn in the coated film was 90 mol % (1.8 chemical equivalents) relative to the amount of carboxyl groups in PAA.

Example 6

A heat-stretched container was produced and its oxygen permeability was determined in a similar way as in Example 1, with exception that the mixing ratio between zinc oxide and resin in the suspension of the zinc oxide granules and resin was 1/2 (mass ratio). The amount of Zn in the coated film was 60 mol % (1.2 chemical equivalents) relative to the amount of carboxyl groups in PAA.

Example 7

As in the case of Example 1, a suspension of zinc oxide granules and a resin, an aqueous mixture of PAA and glycerin, and a suspension of zinc oxide granules and a resin were sequentially applied on a unstretched amorphous PET sheet using a desk coater, followed by drying. In this way a multilayer sheet was produced. The amount of Zn in the coated film was 200 mol % (4 chemical equivalents) relative to the amount of carboxyl groups in PAA. Subsequently, a heat-stretched container was produced using a deep drawn type high speed automatic vacuum pack machine and its oxygen permeability was determined in a similar way as in Example 1.

Example 8

An aqueous mixture of PAA and glycerin and a suspension of zinc oxide granules and a resin, both of which are similar to those prepared in Example 1, were sequentially applied on a unstretched polypropylene sheet (CPP, thickness: 60 μm) instead of a PET sheet by use of a gravure coater, and the resultant sheet was dried.

Subsequently, using a dry laminator a unstretched polypropylene sheet (CPP, thickness: 300 μm) was laminated on the coated surface with the following adhesive: an adhesive obtained by mixing 1 weight part of a curing agent (KX75, a polyisocyanate resin manufactured by Dainippon Ink and Chemicals, Inc.) with 7 weight parts of an adhesive (LX74, resin component: a polyester resin manufactured by Dainippon Ink and Chemicals, Inc.) and by mixing the resultant solution with 48 weight parts of ethyl acetate. Using a vacuum/pressure forming machine (PF-2940, manufactured by Toukatu Seisakusho), the resultant layered sheet was then heated and softened at 210°, and melted and draw-molded, thereby producing a heat-stretched container (width: 180 mm, length: 120 mm, depth: 50 mm). The packaging container was stretched to 2.4 times its area. The amount of Zn in the coated film was 100 mol % (2 chemical equivalents) relative to the amount of carboxyl groups in PAA. The oxygen permeability of the resultant container was determined.

In heat-sterilization for foods, especially in retort treatment, which is high-pressure heat sterilization, air is used for pressurization. For this reason, oxygen enters the container during retort treatment. For food preservation, the amount of oxygen entering the container during retort treatment needs to be as small as possible. Herein, the amount of oxygen entered the container during retort treatment was determined in the following way: after replacing the gas in the container with nitrogen gas, the opening of the container was sealed with aluminum foil, and the container was retorted at 120° C. and 1 kg/cm², and subsequently, the oxygen concentration inside the container was determined using an oximeter. Using the volume and surface area of the container, the obtained oxygen concentration was converted into an oxygen permeability (unit: cm³ (STP)/(m²·h).

Example 9

A heat-stretched container was produced and its oxygen permeability was determined in a similar way as in Example 8, with exception that a unstretched nylon film (CNy, thickness: 70 μm) was used.

Example 10

Using 27 g of a PET bottle preform formed from PET resin (BK-2180, manufactured by Mitsubishi Chemical Corporation) as a base material, an aqueous mixture of PAA and glycerin, which is similar to that prepared in Example 1, was applied on the base material by a dipping method, followed by drying using a drier. Subsequently, a suspension of zinc oxide granules and polyester resin was applied on the dried base material by a dipping method, followed by drying using a drier. The bottle preform thus obtained was then fed into a bottle forming machine (EFB-1000, manufactured by FRONTIER, INC.) at 90° C. to produce a PET bottle (volume: 500 ml, under-neck length: 160 mm, body diameter: 70 μm, thickness: 350 μm). The area of the PET bottle was 10 times the bottle preform, and the oxygen permeability of the PET bottle was determined. Note that the amount of Zn in the coated bottle preform was 125 mol % (2.5 chemical equivalents) relative to the amount of carboxyl groups of PAA.

Example 11

A coated bottle was produced in a similar way as in Example 10, with exception that a PP preform (thickness: 5 mm) formed from PP resin (Homo PPJ247TW, manufactured by Mitsui Sumitomo Polyolefin Co., Ltd.) was used as a base material. The coated bottle was then fed into a bottle forming machine (EFB-2000, manufactured by FRONTIER, INC.) at 124° C. to produce a PP bottle (volume: 500 ml, under-neck length: 160 mm, body diameter: 70 μm, thickness: 350 μm). The area of the PP bottle was 10 times the bottle preform, and the oxygen permeability of the PP bottle was determined.

Comparative Example 1

A heat-stretched container was produced and its oxygen permeability was determined in a similar way as in Example 1, with exception that only a unstretched amorphous PET sheet was used without applying neither an aqueous mixture of PAA and glycerin nor a suspension of zinc oxide granules and a resin on it.

Comparative Example 2

A heat-stretched container was produced and its oxygen permeability was determined in a similar way as in Example 1, with exception that only a suspension of zinc oxide granules and a resin was applied on a base material without applying an aqueous mixture of PAA and glycerin on it.

Comparative Example 3

A heat-stretched container was produced and its oxygen permeability was determined in a similar way as in Example 1, with exception that only an aqueous mixture of PAA and glycerin was applied on a base material without applying a suspension of zinc oxide granules and resin a on it.

TABLE

| Examples/Comparative examples | Layer configuration | Area draw ratio | chemical equivalent ratio between metal and carboxyl group | Oxygen Permeability(Note[1]) | Mixing ratio between PAA and plasticizer (mass ratio) |
|---|---|---|---|---|---|
| Example 1 | PET/PAA + glycerin/ZR | 1.4 | 2 | 35 | 90/10 |
| Example 2 | PET/nPAA(Note[2]) + PEG/ZR | 1.4 | 2 | 30 | 90/10 |
| Example 3 | PET/PAA + sorbitol/ZR | 1.4 | 1.9 | 35 | 95/5 |
| Example 4 | PET/PAA + EG/ZR | 1.4 | 2.6 | 35 | 70/30 |
| Example 5 | PET/PAA + glycerin/ZR | 1.4 | 1.8 | 35 | 99.9/0.1 |
| Example 6 | PET/PAA + glycerin/ZR | 1.4 | 1.2 | 70 | 90/10 |
| Example 7 | PET/ZR/PAA + glycerin/ZR | 1.4 | 4 | 10 | 90/10 |
| Example 8 | CPP/PAA + glycerin/ZR//CPP | 2.4 | 2 | 100 | 90/10 |
| After retort treatment | | | | 27 | |
| Example 9 | CNy/PAA + glycerin/ZR//CPP | 2.4 | 2 | 32 | 90/10 |
| Example 10 | PET/PAA + glycerin/ZR | 10 | 2.5 | 18 | 90/10 |
| Example 11 | PP/PAA + glycerin/ZR | 10 | 2.5 | 62 | 90/10 |
| Comparative Example 1 | PET | 1.4 | — | 250 | |
| Comparative Example 2 | PET/ZR | 1.4 | — | 250 | |
| Comparative Example 3 | PET/PAA + glycerin | 1.4 | — | 250 | 90/10 |

Note[1]:
(unit: cm³ (STP)/(m² · day · MPa) (30° C., 80% RH))

Note[2]:
partially neutralized PAA

In this Table 1 PET, PAA, EG, PEG, ZR, CPP, CNy, and symbol // represent unstretched amorphous polyethylene terephthalate, polyacrylic acid, ethylene glycol, polyethylene glycol, a mixture of zinc oxide granules and a polyester resin, unstretched polypropylene, unstretched nylon and an adhesive layer, respectively.

INDUSTRIAL APPLICABILITY

Stretchable films which consist of a layer made of a polyacrylic acid-based polymer, a layer made of a multivalent metal compound, and a layer made of thermoplastic resin, have not been developed heretofore. The present invention has made it possible to provide a stretch-formed multilayer container by stretching stretchable multilayer sheets or multilayer preforms, thereby increasing the possibility that they will find their application in this field.

The invention claimed is:

1. A stretched-formed multilayer container having excellent oxygen-gas barrier properties formed by stretching a multilayer sheet or a multilayer preform at an area draw ratio of 1.1 to 100 times, said multilayer sheet or said multilayer preform comprising:
   a layer (a) made of a thermoplastic resin (A); and
   at least one layer unit of a (bc)/(de) layer unit or a (de)/(bc) layer unit which is arranged on at least one surface of layer (a) with or without an adhesive backing, said (bc)/(de) layer unit or said (de)/(bc) layer unit consisting of:
      a layer (bc) made of a mixture of a polycarboxylic acid-based polymer (B) and a plasticiser (C); and
      a layer (de) made of a mixture of a bivalent metal compound (D) and a resin (E), said layer (bc) and said layer (de) being adjacent to each other,
      said layer (bc) and said multilayer sheet or said multilayer preform having not been subjected to a heating operation that facilitates esterification between hydroxyl groups of the plasticiser (C) and carboxyl groups of the polycarboxylic acid-based polymer (B) in the layer (bc), and
      said multilayer sheet or said multilayer preform containing a bivalent metal compound (D) so that the chemical equivalent of a bivalent metal in the total amount (Dt) of the bivalent metal compound (D) is 0.2 or more relative to the total amount (Bt) of carboxyl groups contained in the layers (bc) and (de).

2. The stretched-formed multilayer container according to claim 1, containing at least one a (de)/(bc)/(de) layer unit, which has the layer (bc) and the layer (de) adjacent to each other.

3. The stretched-formed multilayer container according to claim 1, wherein the mixing ratio between the polycarboxylic acid-based polymer (B) and the plasticiser (C) is 85/15 to 99.9/0.1 (mass ratio).

4. The stretched-formed multilayer container according to claim 1, wherein the polycarboxylic acid-based polymer (B) has an oxygen permeability coefficient of 1,000 cm$^3$ (STP)·μm/(m$^2$·day·MPa) or less at 30° C. and relative humidity of 0% when formed into a film by itself.

5. The stretched-formed multilayer container according to claim 1, wherein the polycarboxylic acid-based polymer (B) is a homopolymer, a copolymer and/or a mixture thereof, the homopolymer and the copolymer consisting of at least one of polymerizable monomer units selected from acrylic acid, maleic acid and methacrylic acid.

6. The stretched-formed multilayer container according to claim 1, which is used for boiling or retort sterilization.

7. A multilayer preform used for the stretched-formed multilayer container according to claim 1.

8. A multilayer sheet used for the stretched-formed multilayer container according to claim 1.

9. A production method of a stretch-formed multilayer container having excellent oxygen-gas barrier properties, comprising:
   providing a multilayer sheet or a multilayer preform obtained by coating at least one a (bc)/(de) layer unit or a (de)/(bc) layer unit on a layer (a) made of a thermoplastic resin (A), said (bc)/(de) layer unit or said (de)/(bc) layer unit consisting of a layer (bc) made of a mixture of a polycarboxylic acid-based polymer (B) and a plasticiser (C) and a layer (de) made of a mixture of a multivalent metal compound (D) and a resin (E), said layer (bc) and said layer (de) adjacent to each other, said layer (bc) and said stretch-formed multilayer container being formed without a heating operation that facilitates esterification between hydroxyl groups of the plasticiser (C) and carboxyl groups of the polycarboxylic acid-based polymer (B) in the layer (bc); and
   stretching said multilayer sheet or said multilayer preform at an area draw ratio of 1.1 to 100 times.

10. The production method according to claim 9, wherein at least one of a (de)/(bc)/(de) layer unit, which has the layer (bc) and the layer (de) adjacent to each other, is provided.

11. The production method according to claim 9, wherein in all of the layer (bc) and the layer (de), the chemical equivalent of the multivalent metal in the total amount (Dt) of the multivalent metal compound (D) is 0.2 or more relative to the total amount (Bt) of carboxyl groups contained in the layer (bc) and the layer (de).

12. The production method according to claim 9, wherein the mixing ratio between the polycarboxylic acid-based polymer (B) and the plasticiser (C) is 85/15 to 99.9/0.1 (mass ratio).

13. The production method according to claim 9, wherein the polycarboxylic acid-based polymer (B) has an oxygen permeability coefficient of 1,000 cm$^3$ (STP)·μm/(m$^2$·day·MPa) or less at 30° C. and relative humidity of 0% when formed into a film by itself.

14. The production method according to claim 9, wherein the polycarboxylic acid-based polymer (B) is a homopolymer, a copolymer and/or a mixture thereof, the homopolymer and the copolymer consisting of at least one of polymerizable monomer units selected from acrylic acid, maleic acid and methacrylic acid.

15. The production method according to claim 9, wherein the multivalent metal compound (D) is a bivalent metal compound.

16. The production method according to claim 9, wherein said multilayer sheet or said multilayer preform is stretched at an area draw ratio of 1.1 to 50 times without concurrent heat treatment.

17. The production method according to claim 16, wherein said multilayer sheet or said multilayer preform is stretched at an area draw ratio of 1.1 to 25 times without concurrent heat treatment.

18. The production method according to claim 17, wherein said multilayer sheet or said multilayer preform is stretched at an area draw ratio of 1.1 to 5 times without concurrent heat treatment.

* * * * *